(12) United States Patent
Nakamura

(10) Patent No.: US 10,705,279 B2
(45) Date of Patent: Jul. 7, 2020

(54) DISPLAY DEVICE

(71) Applicant: SHARP KABUSHIKI KAISHA, Sakai, Osaka (JP)

(72) Inventor: Yoshitake Nakamura, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/555,013

(22) Filed: Aug. 29, 2019

(65) Prior Publication Data

US 2020/0073042 A1  Mar. 5, 2020

Related U.S. Application Data

(60) Provisional application No. 62/727,445, filed on Sep. 5, 2018.

(51) Int. Cl.
*F21V 8/00* (2006.01)
(52) U.S. Cl.
CPC .................. *G02B 6/0028* (2013.01)
(58) Field of Classification Search
CPC ..................................... G02B 6/0028
See application file for complete search history.

(56) References Cited

U.S. PATENT DOCUMENTS

| | | | | |
|---|---|---|---|---|
| 7,188,988 B2* | 3/2007 | Koganezawa | ....... | G02B 6/0028 362/561 |
| 7,407,316 B2* | 8/2008 | Noh | ..................... | G02B 6/0061 362/612 |
| 9,829,623 B2 | 11/2017 | Sugimoto | | |
| 2009/0273732 A1* | 11/2009 | Shimura | .............. | G02B 6/0016 349/65 |
| 2009/0316074 A1* | 12/2009 | Tomiyoshi | ........... | G02B 6/0046 349/65 |
| 2010/0073903 A1* | 3/2010 | Yun | ..................... | G02B 6/0016 362/97.1 |
| 2016/0170132 A1 | 6/2016 | Sugimoto | | |

FOREIGN PATENT DOCUMENTS

WO  2015/016091 A1  2/2015

* cited by examiner

*Primary Examiner* — Evan P Dzierzynski
(74) *Attorney, Agent, or Firm* — ScienBiziP, P.C.

(57) ABSTRACT

A display device includes a display component, a light source, and a light guide component. The display component includes a display area and a non-display area. The light guide component includes a first light guide plate disposed behind the display area, a second light guide plate disposed adjacent to the light source and lateral to the first light guide plate, and a joint member disposed behind the non-display area. The first light guide plate includes a plate surface with an area larger than the display area. The plate surface includes a light exiting surface. The second light guide plate includes a light entering surface. The joint member joins the first light guide plate and the second light guide plate together. A space is present between the first light guide plate and the second light guide plate and surrounded by the joint member.

8 Claims, 5 Drawing Sheets

DISPLAY DEVICE

CROSS REFERENCE TO RELATED APPLICATION

This application claims priority from U.S. Provisional Patent Application No. 62/727,445 filed on Sep. 5, 2018. The entire contents of the priority application are incorporated herein by reference.

TECHNICAL FIELD

The technology described herein relates to a display device including a lighting unit configured to emit planar light.

BACKGROUND ART

A display device that includes display components including a liquid crystal panel includes a lighting unit behind the liquid crystal panel. The lighting unit may be an edge light type backlight that includes a light guide component closer to the liquid crystal panel and a light source closer to a side of the light guide component. In the edge light type backlight, light from the light source enters the light guide plate through an end surface, travels through the light guide plate, and exit the light guide plate through a surface on the front side. The light source may include light emitting diodes (LEDs). The light guide component is made of a material having higher light transmissivity, for example, a resin such as acrylic and polycarbonate. International Publication WO 2015/016091 discloses an edge light type backlight used for a display device.

The light source in the edge light type backlight is disposed slightly away from an end surface of the light guide component with a small gap. Because the light guide component is made of the resin such as acrylic and polycarbonate, the light guide component expands or contracts according to an ambient temperature or humidity. During light emission of the light source, heat is generated. If the light emission of the light source continues for long hours, the heat is transmitted to the light guide component and the light guide component expands. The end surface of the light guide component may contact the light source. If the light guide component contacts the light source, the light source may be broken and a portion may be illuminated. Furthermore, the resin of the light guide component may be burned due to the heat of the light source and the light transmissivity may decrease. As a result, uneven brightness (a dark sport) is less likely to occur.

As a screen size (a display area) of a display device increases, a size of a light guide plate increases. Therefore, an increase in size of the light guide component due to an expansion increases. The number of light source or an amount of light emission of the light source may be increased to increase an amount of light to illuminate the entire screen. In this case, an amount of heat from the light source increases and thus an amount of heat transmitted to the light guide component. As a result, the increase in size of the light guide component due to the expansion further increases.

In the lighting unit in WO 2015/016091, light guide plates are arranged at intervals. The light guide plates are configured to expand toward gaps between the light guide plates even if the light (guide plates expand due to the ambient temperature or humidity. Therefore, distances between the light source and the light guide plates are maintained constant and the light guide plates are less likely to contact the light source.

In the lighting unit in Patent Document 1, sizes of the gaps between the light guide plates and displacement of the light guide plates in a thickness direction, a loss occurs in amount of entering light transmitted from the light guide plate to the light guide plate and thus light use efficiency decreases. Furthermore, the sized of the gaps between the light guide plates vary due to the expansion and the contraction of the light guide plates according to the ambient temperature or humidity. Therefore, a variation in the light use efficiency according to the ambient temperature may cause uneven brightness. Still furthermore, the gaps between the light guide plates are located in the display area of the liquid crystal panel, a difference between an amount of light that leaks through the gaps between the light guide plates and an amount of light that exits through the planar surfaces of the light guide plates may cause uneven brightness.

SUMMARY

The technology described herein was made in view of the above circumstances. An object is to provide a display device in which an end surface of a light guide plate is less likely to contact a light source even if the light guide plate is expanded and uneven brightness is less likely to occur in a display area of a display panel.

A display device according to the technology described herein includes a display component, a light source, and a light guide component. The display component includes a display area and a non-display area. The light guide component includes a light entering surface through which light from the light source enters and light exiting surface through which the light entering through the light entering surface exits toward the display area. The light guide component includes a first light guide plate, a second light guide plate, and a joint member. The first light (guide plate is disposed behind the display area. The first light guide plate includes a plate surface with an area larger than the display area. The plate surface includes the light exiting surface. The second light (guide plate is disposed adjacent to the light source and lateral to the first light guide plate. The second light guide plate includes an end surface that includes the light entering surface. The joint member is disposed behind the non-display area. The joint member includes two openings in which a first end of the first light guide plate and a first end of the second light guide late are inserted, respectively, to join the first light guide plate and the second light guide plate together. A space is present between the first light guide plate and the second light guide plate and surrounded by the joint member.

Even if the light guide plate is expanded, the end surface of the light guide plate is less likely to contact the light source and uneven brightness is less likely to occur in the display area of the display panel.

DETAILED DESCRIPTION

First Embodiment

A first embodiment of the technology described herein will be described in detail with reference to FIGS. 1 to 4.

Figure 1:
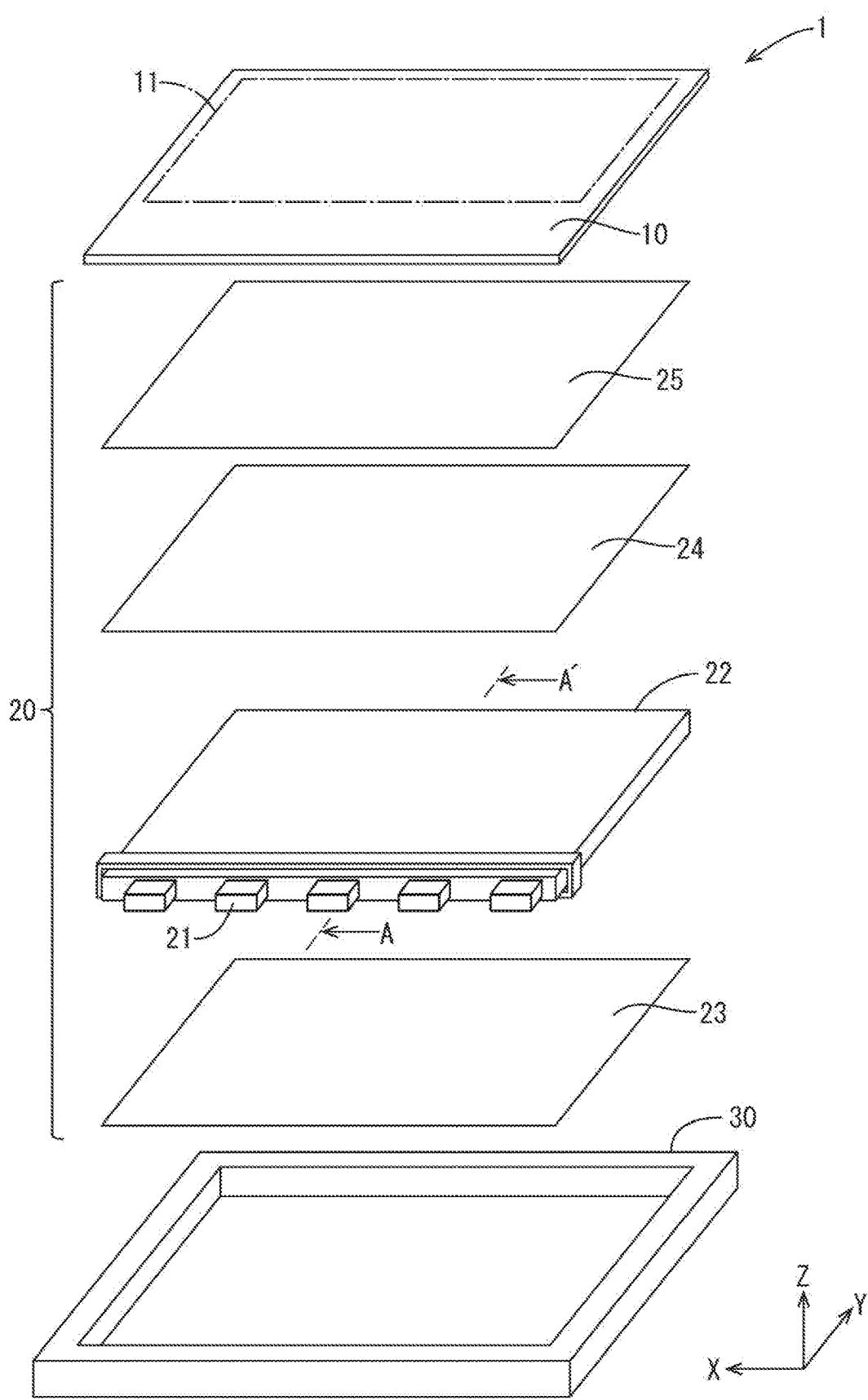
FIG. 1 is a schematic view of a liquid crystal display device according to a first embodiment of the technology described herein.

FIG. 1 is a schematic view of a liquid crystal display device (a display device) according to the first embodiment.

The liquid crystal display device 1 includes a liquid crystal panel 10 (a display component), a backlight unit 20, and a lower frame 30. The backlight unit 20 is disposed behind the liquid crystal panel 10. The lower frame 30 holds the backlight unit 20 therein. The liquid crystal display device 1 is used for a display device such as a smartphone, a tablet terminal, a notebook PC, and a monitor.

The liquid crystal panel 10 includes a display area 11 in which images are displayed and a non-display area around the display area 11. In the non-display area of the liquid crystal panel 10, a driver IC and a flexible printed circuit board (FPC) are mounted.

The backlight unit 20 includes optical sheets, a light guide component 22, and a reflection sheet 23 that are disposed on top of each other. The optical sheets include a lens sheet 25 and a diffuser sheet 24. The backlight unit 20 includes light sources 21 disposed on an end surface of the light guide component 22. The light guide component 22 includes a light entering surface 228 through which light from the light sources enters and light exiting surface 229 through which the light entering through the light entering surface 228 exits toward the display area 11. The light sources 21 are not limited to a specific type of light sources. LEDs may be used for the light sources 21. In this embodiment multiple light sources 21 are arranged along the light entering surface 228 of the light guide component 22 (in the X-axis direction in each drawing). The reflection sheet 23 is disposed behind the light guide component 22 and configured to reflect the light exiting through a back surface 237 of the light guide component 22 toward the liquid crystal panel 10 (toward the front side).

The lens sheet 25 and the diffuser sheet 24 are disposed in front of the light guide component 22 and configured to collect or diffuse the light exiting the light guide component 22 through the light exiting surface 229.

The lower frame 30 has a box shape to hold the backlight unit 20 therein. A material of the lower frame is not limited to a specific material. A resin as polycarbonate or a metal such as aluminum and stainless steel may be used.

Figure 2:
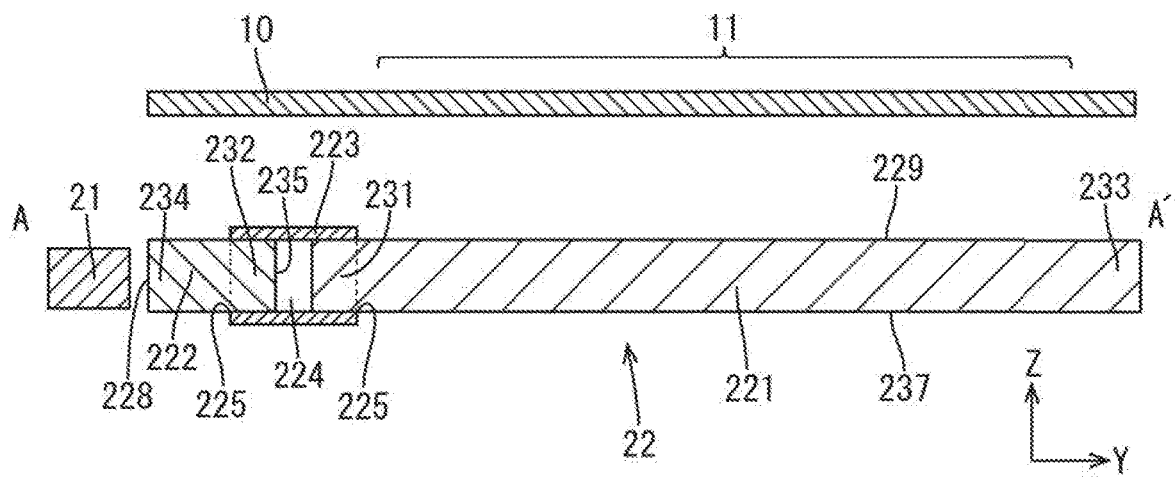
FIG. 2 is a cross-sectional view along line A-A' in FIG. 1.

FIG. 2 is a cross-sectional view along line A-A' in FIG. 1

The light guide component 22 includes a first light guide plate 221, a second light guide plate 222, and a joint member 223. The first light guide plate 221 includes the light exiting surface 229. The second light guide plate 222 includes the light entering surface 228. The first light guide plate 221 and the second light guide plate 222 are joined together by the joint member 223.

The first light guide plate 221 is disposed behind the display area 11 of the liquid crystal panel 10 to guide the light from the light sources 21 toward the display area 11.

The first light guide plate 221 has a plate shape and includes plate surfaces with an area larger than the display area 11. A light distribution pattern is formed on the back surface 237 of the first light guide plate 221 on the back side to emit uniform light.

The second light guide plate 222 is disposed adjacent to the light sources 21 and lateral to the first light guide plate 221. The second light guide plate 222 has a plate shape and includes plate surfaces with an area smaller than the first light guide plate 221. The second light guide plate 222 is disposed behind the non-display area of the liquid crystal panel 10. The light distribution pattern that is formed on the first light guide plate 221 may be formed on the plate surface of the second light guide plate 222 on the back side. The first light guide plate 221 and the second light guide plate 222 may be made of a material having higher light transmissivity. To reduce thicknesses and weights, a resin such as acrylic and polycarbonate may be used.

The first light guide plate 221 and the second light guide plate 222 are joined together by the joint member 223 and provided as a combined component. The joint member 223 is disposed behind the non-display area of the liquid crystal panel 10.

Figure 3:
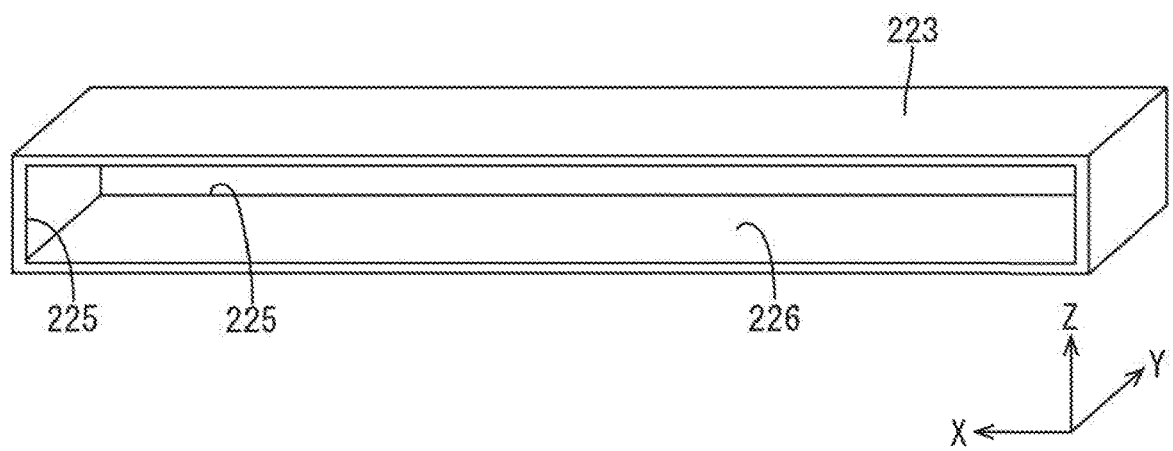
FIG. 3 is a magnified schematic view of a connecting portion illustrated in FIG. 2.

The joint member 223 will be described in detail with reference to FIG. 3. FIG. 3 is a magnified view of the joint member 223.

As illustrated in FIG. 3, the joint member 223 has a rectangular columnar shape and includes two openings 225. To join the first light guide plate 221 and the second light guide plate 222 together and provide as the combined component, a first end 231 of the first light guide plate 221 and a first end 232 of the second light guide plate 222 are inserted in the openings 225, respectively. A material of the joint member 223 is not limited to a specific material; however, a white resin such as a white polycarbonate or a metal such as aluminum and stainless steel may be used. With such a material, the light can be reflected by an inner surface 226 of the joint member 223. If the joint member 223 is made of a black material having lower light reflectivity, the inner surface 226 may be painted in white or silver-coated through vapor deposition to reflect the light.

As illustrated in FIG. 2, a space 224 is provided between the first light guide plate 221 and the second light guide plate 222. When the ambient temperature or humidity varies, the first light guide plate 221 or the second light guide plate 222 expands in a direction to become closer to each other. Namely, the expansion of the first light guide plate 221 or the second light guide plate 222 is within the space 224. A size of the space 224 is defined such that the first light guide plate 221 and the second light guide plate 222 do not contact each other even the expansion occurs. If a second end 233 of the first light guide plate 221 on an opposite side from the first end 231 and a second end 234 of the second light guide plate 222 on an opposite side from the first end 232 are fixed to the lower frame 30, the first light guide plate 221 and the second light guide plate 222 are more likely to expand in the direction to become closer to each other.

Figure 4:
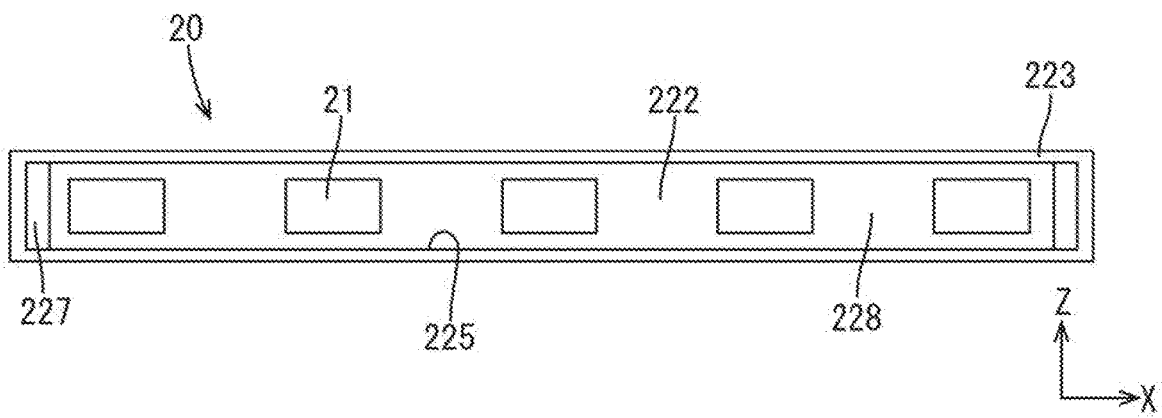
FIG. 4 is a side view of a guide plate illustrated in FIG. 1.

FIG. 4 is a side view of the light guide component viewed from a light source 21 side.

As illustrated in FIG. 4, in the opening 225 in which the first end 232 of the second light guide plate 222 is inserted, spaces 227 are present between the joint member 223 and the second light guide plate 222 with respect to the length direction of the opening 225 (the X-axis direction). Namely, the spaces 227 are present between the second light guide component 22 and the joint member 223 with respect to the length direction (the X-axis direction). If the second light guide plate 222 is expanded due to a variation in the ambient temperature or humidity, the expansion of the second light guide plate 222 is within the spaces 227. Therefore, the joint member 223 is less likely to be broken and the second light guide plate 222 is less likely to deform due to the expansion of the second light guide plate 222. The spaces 227 are defined in consideration of the expansion of the second light guide plate 222 in the length direction. If the joint member 223 is made of a material having an expansion rate similar to that of the second light guide plate 222 or a soft resin such as a silicone-based resin and a rubber-based resin, the joint member 223 may expand or deform according to the expansion of the second light guide plate 222. Without the spaces 227, the joint member 223 is less likely to be broken or deformed.

Spaces are not present between the second light guide plate 222 and the joint member 223 with respect to a thickness direction (the Z-axis direction). If the space with respect to the thickness direction is provided, light may leak through the space with respect to the thickness direction and the light may enter the display area 11. This may cause uneven brightness (a bright spot).

The joint structure between the joint member 223 and the second light guide plate 222 has been described with respect to FIG. 4. The joint structure between joint member 223 and the first light guide plate 221 is similar to the joint structure between the joint member 223 and the second light guide plate 222. In the opening 225 in which the first end 231 of the first light guide plate 221 is inserted, spaces 227 are present between the joint member 223 and the first light guide plate 221 with respect to the length direction of the opening 225 (the X-axis direction).

The light emitted by the light sources 21 enters the second light guide plate 222 through the light entering surface 228 (the end surface on the opposite side from the first end 232), travels through the second light guide plate 222, and exits through the end surface on the first end 232 side opposed to the space 224 (the second light guide plate-side light exiting surface 235). The light exiting the second guide plate 222 passes through the space 224 and enters the first light guide plate 221 through an end surface on the first end 231 side. Some rays of the light from the second light guide plate 222 do not directly enter the first light guide plate 221. The rays of the light are reflected by the inner surface 226 of the joint member 223. The rays of the light travel through the space 224 and enters the first light guide plate 221. The rays of the light entering the first light guide plate 221 travel through the first light guide plate 221, exit through the light exiting surface 229 (the plate surface on the liquid crystal panel 10 side), and illuminate the display area 11.

In this embodiment, the first light guide plate 221 disposed behind the display area 11 includes the plate surface that has the area larger than the display area. The plate surface includes the light exiting surface 229. According to the configuration, the display area 11 is uniformly illuminated and thus the uneven brightness is less likely to occur. The space 224 between the first light guide plate 221 and the second light guide plate 222 is surrounded by the joint member 223. The rays of the light from the second light guide plate 222, which do not directly enter the first light guide plate 221, are reflected by the inner surface 226 of the joint member 223. Then, the rays of the light enter the first light guide plate 221. If the first light guide plate 221 and the second light guide plate 222 expand and the dimension of the space 224 varies, an amount of light that travels from the second light guide plate 222 and directly enters the first light guide plate 221 may vary. Because the space 224 is surrounded by the joint member 223, the rays of the light from the second light guide plate 222 are reflected by the inner surface 226 of the joint member 223. Therefore, the light enters the first light guide plate 221 without light loss. Furthermore, the second light guide plate 222 adjacent to the light sources 21 has the area smaller than the first light guide plate 221. Even if the second light guide plate 222 expands toward the light sources 21, the expansion is small and thus the second light guide plate 222 is less likely to contact the light sources 21.

Second Embodiment

A second embodiment of the technology described herein will be described in detail with reference to FIGS. 5A and 5B. Components having functions similar to those of the above embodiment will be indicated by the reference symbols of those of the above embodiment and will not be described for the purpose of illustration.

Figure 5A:
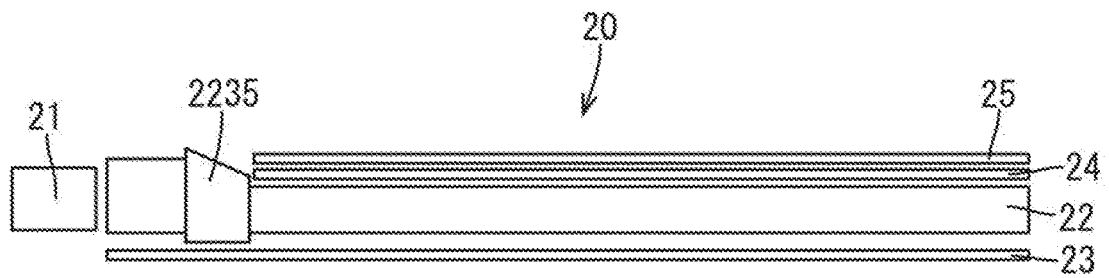
FIG. 5A is a side view of a backlight unit according to a second embodiment.

FIG. 5A is a side view that schematically illustrates a backlight unit 20 in the second embodiment of the technology described herein. FIG. 5B is a cross-sectional view of a light guide component 22 illustrated in FIG. 5A.

Figure 5B:
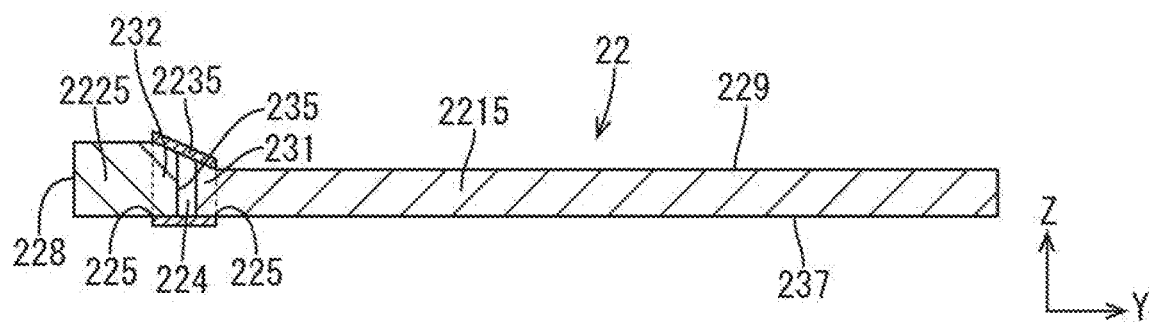
FIG. 5B is a cross-sectional view of a light guide component illustrated in FIG. 5A.

As illustrated in FIGS. 5A and 5B, the light guide component 22 includes a second light guide plate 2225 that has a thickness (a dimension in a thickness direction (the Z-axis direction)) larger than a thickness of a first light guide plate 2215. The second light guide plate 2225 is disposed adjacent to the light sources 21. The lens sheet 25 and the diffuser sheet 24 are disposed on the first light guide plate 2215 that has the smaller thickness.

The first light guide plate 2215 and the second light guide plate 2225 are joined together and provided as a combined component. Similar to the first embodiment, a joint member 2235 is formed in a tubular shape with two openings 225. Because the joint member 2235 combines the second light guide plate 2225 having the larger thickness and the first light guide plate 2215 having the smaller thickness, the combined component is formed in a trapezoidal shape with a slope surface when viewed from a side. The first end 231 of the first light guide plate 2215 and the first end 232 of the second light guide plate 2225 include slopes that contact the slope surface.

If the thickness of the second light guide plate 2225 is larger than the thickness of the first light guide plate 2215, some rays of the light from the second light guide plate 2225 may not enter the first light guide plate 2215. Furthermore, the light may be leaked to the display area 11 and uneven brightness (a bright spot) may occur.

In the configuration of the second embodiment, the first light guide plate 2215 and the second light guide plate 2225 are combined by the joint member 223. The rays of the light from the second light guide plate 2225 are reflected by the inner surface 226 of the joint member 2235. The rays of the light enter the first light guide plate 2215. Because the light is less likely to be leaked to the display area 11, the uneven brightness is less likely to occur.

The lens sheet 25 and the diffuser sheet 24 are disposed on a first light guide plate 2216 having the thickness smaller than the thickness of the second light guide plate 2225. Therefore, the thickness of the backlight unit 20 can be reduced in comparison to the first embodiment.

Modification A

Figure 6A:
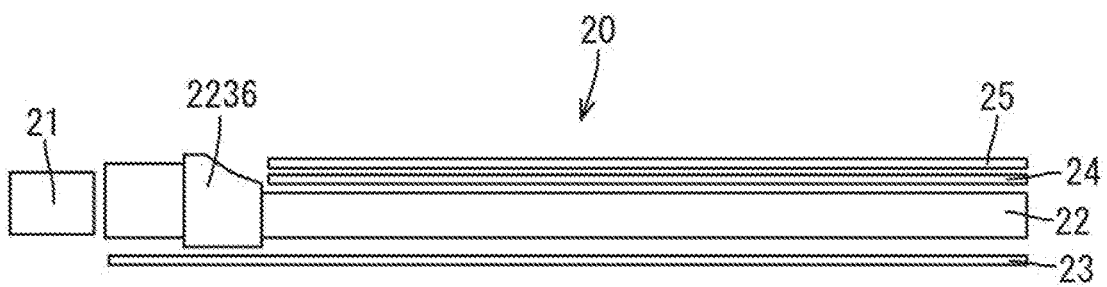
FIG. 6A is a side view of modification A of the second embodiment.
Figure 6B:
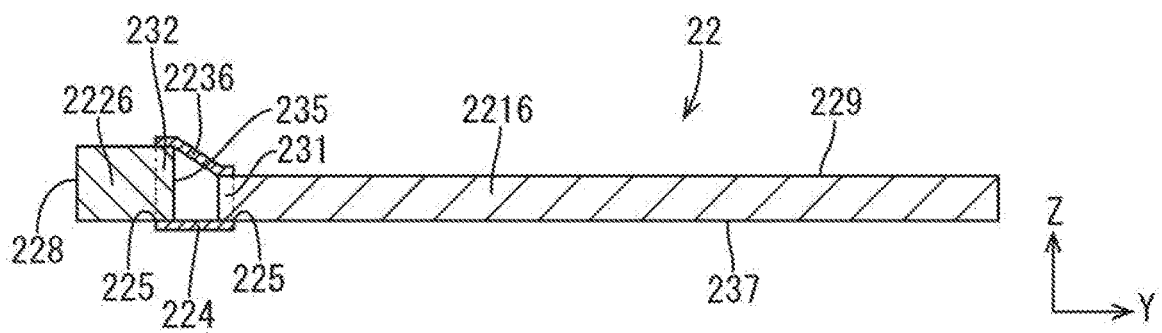
FIG. 6B is a cross-sectional view of a light guide component illustrated in FIG. 6A.

FIG. 6A is a side view that schematically illustrates a backlight unit 20 according to modification A of the second embodiment of the technology described herein. FIG. 6B is a cross-sectional view of a light guide component 22 illustrated in FIG. 6A.

As illustrated in FIG. 6A, the joint member has a shape different from the one illustrated in FIG. 5A. As illustrated in FIG. 6B, a first light guide plate and a second light guide plate are formed in flat plate shapes without slopes.

As illustrated FIG. 6B, the first light (guide plate 2216 and a second light guide plate 2226 are formed in the flat plate shapes with different thicknesses. A joint member 2236 includes two flat surfaces and a slope surface. The flat surfaces contact first, ends of the first light guide plate 2216 and the second light guide plate 2226 that have the flat plate shapes. The slope surface joins the flat surfaces together.

According to the configuration of modification A, the same effect as that of the second embodiment can be achieved.

Third Embodiment

A third embodiment of the technology described herein will be described in detail with reference to FIG. 7. Components having functions similar to those of the above embodiments will be indicated by the reference symbols of those of the above embodiments and will not be described for the purpose of illustration.

FIG. 2 is a plan view that schematically illustrates a light guide component in the third embodiment.

Figure 7:
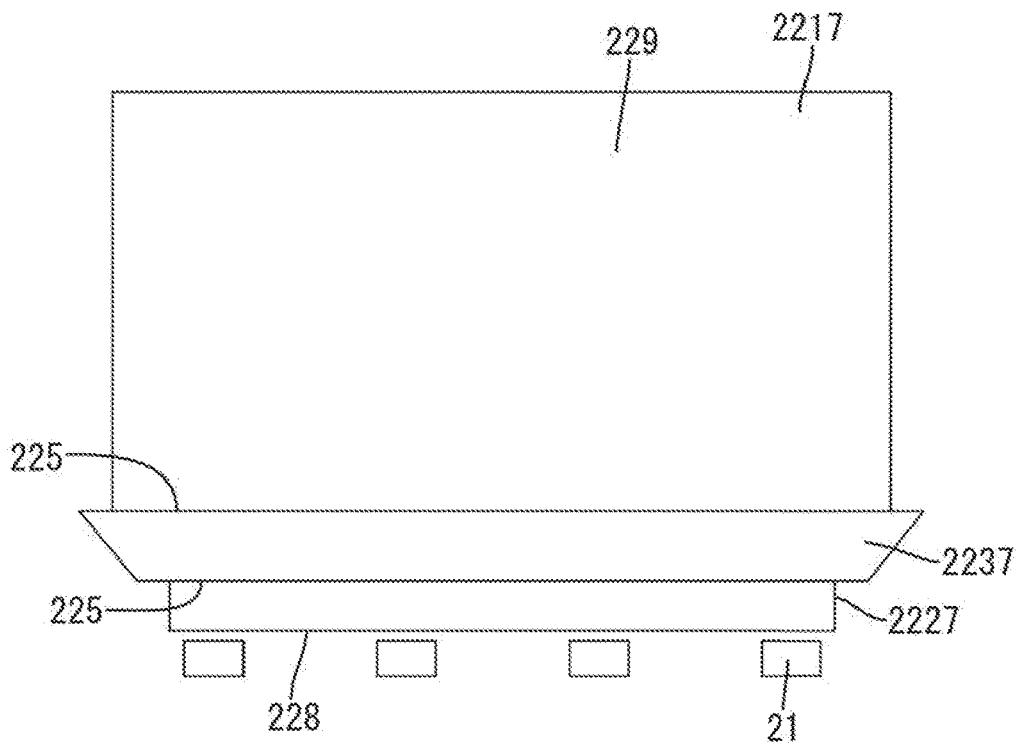
FIG. 7 is a plan view of a light guide component according to a third embodiment.

As illustrated in FIG. 7, a length (in the X-axis direction) of the first light guide plate 2217 is larger than a length of a second light guide plate 2227. The first light guide plate 2217 and the second light guide plate 2227 that have the different lengths are joined by a joint member 2237 and provided as a combined component. The combined component has a trapezoidal shape in a plan view.

Even through the first light guide plates 2217 and the second light guide plate 2227 have the different lengths, some rays of light from the second light guide plate 2227 are reflected by an inner surface 226 of the joint member 2237. The rays of the light enter the first light guide plate 2217.

Modification B

Figure 8:
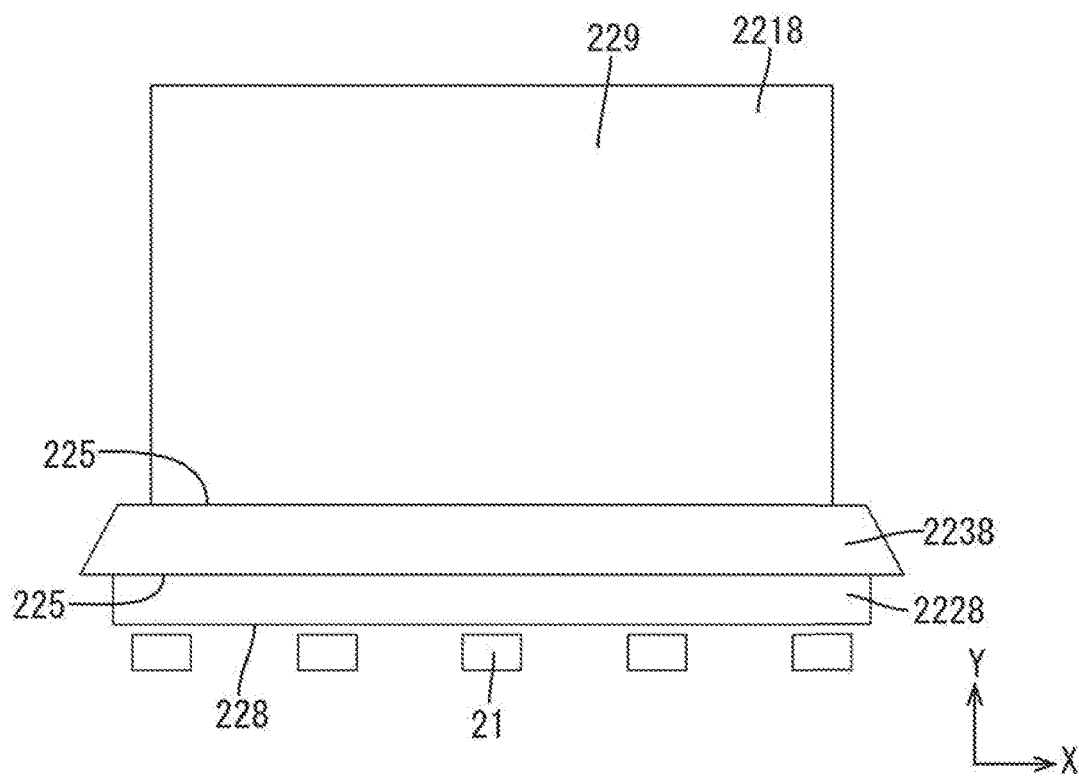
FIG. 8 is a plan view of modification B of the third embodiment.

FIG. 8 is a plan view that schematically illustrates a light guide component 22 according to modification B of the third embodiment of the technology described herein.

As illustrated in FIG. 8, a length of a first guide plate 2218 is smaller than a length of a second light (guide plate 2228.

According to the configuration of modification B, similar to the third embodiment, some rays of light from a second light guide plate 2228 are reflected by an inner surface of a joint member 2238. The rays of the light enter the first light guide plate 2218.

Fourth Embodiment

A fourth embodiment of the technology described herein will be described in detail with reference to FIGS. 9A and 9B. Components having functions similar to those of the above embodiments will be indicated by the reference symbols of those of the above embodiments and will not be described for the purpose of illustration.

Figure 9A:
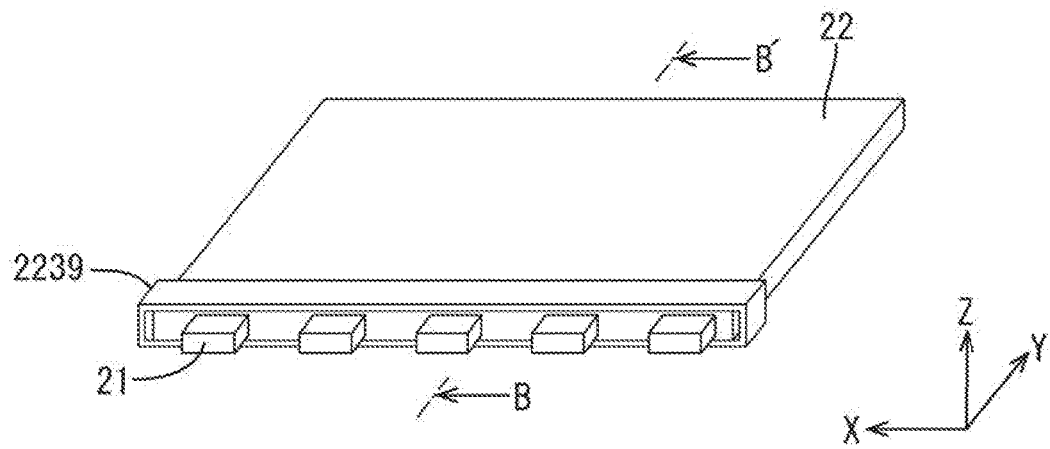
FIG. 9A is a schematic view of a light guide component according to a fourth embodiment.

FIG. 9A is a schematic view that schematically illustrates a light guide component 22 according to the fourth embodiment. FIG. 9B is a cross-sectional view of the light guide component 22 illustrated in FIG. 9A.

Figure 9B:
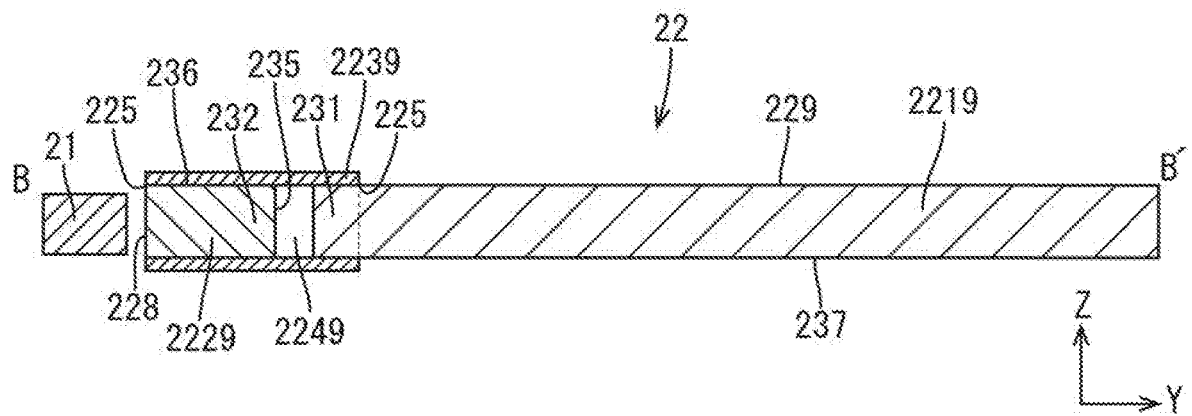
FIG. 9B is a cross-sectional view of the light guide component illustrated in FIG. 9A.

As illustrated in FIGS. 9A and 9B, a joint member 2239 surrounds a space 2249 and covers side surfaces 236 of a second light guide plate 2229 (four surfaces at ends in the Z-axis direction and the X-axis direction, the surfaces of the second light guide plate 2229 other than a light entering surface 228 and a second light guide plate-side light exiting surface 235).

Rays of light exiting through the side surfaces 236 of the second light guide plate 2229 are reflected by the inner surface of the joint member 2239. Therefore, the light from the light sources 21 can be properly directed from the second light guide plate 2229 to a first light guide plate 2219 and thus light use efficiency improves. The rays of the light exiting through the side surface 236 closer to the liquid crystal panel 10 are less likely to be leaked to the display area AA and to cause uneven brightness.

Modification C

Figure 10:
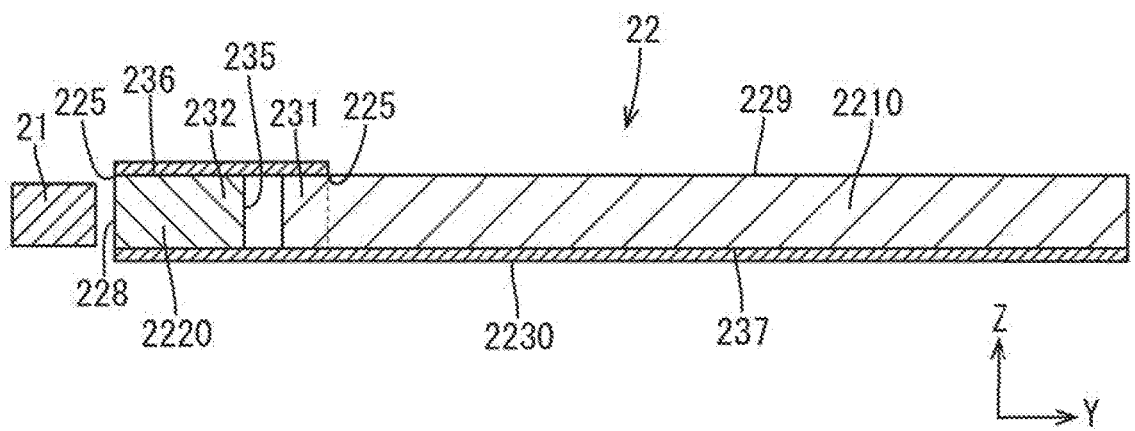
FIG. 10 is a cross-sectional view of modification C of the fourth embodiment.

FIG. 10 is a cross-sectional view that schematically illustrates a light guide component 22 according to modification C of the fourth embodiment.

As illustrated in FIG. 10, a joint member 2230 covers a back surface 237 of a first light guide plate 2210.

Some rays of light exiting a first light guide plate 2210 through the back surface 237 are reflected by an inner surface 226 of the joint member 2230. Therefore, the reflection sheet 23 includes in the first embodiment is not required.

Side surfaces of the first light guide plate 2210 may be covered with the joint member 2230 in addition to the back surface 237 of the first light guide plate 2210. Rays of light exiting the first light guide plate 2210 through the side surfaces are reflected by the inner surfaces 226 of the joint member 2230. According to the configuration, the light use efficiency further improves.

The technology described herein is not limited to the embodiments described in the above descriptions and drawings. Various modifications within the scope of the claims may be possible. Embodiments that include technical features obtained through combinations of the technical features of the different embodiments may be included in the technical scope of the technology described herein. New technical features may be provided through combinations of the technical features of the embodiments.

The invention claimed is:

1. A display device comprising:
   a display component including a display area and a non-display area;
   a light source; and
   a light guide component including a light entering surface through which light from the light source enters and a light exiting surface through which the light entering through the light entering surface exits toward the display area, wherein
   the light guide component comprises:
      a first light guide plate being disposed behind the display area and including a plate surface with an area larger than the display area, the plate surface including the light exiting surface;

a second light guide plate being disposed adjacent to the light source and lateral to the first light guide plate and including an end surface including the light entering surface; and a joint member being disposed behind the non-display area, the joint member including two openings in which a first end of the first light guide plate and a first end of the second light guide plate are inserted, respectively, to join the first light guide plate and the second light guide plate together, and a space is present between the first light guide plate and the second light guide plate and surrounded by the joint member.

2. The display device according to claim 1, wherein the joint member is made of white resin or metal.

3. The display device according to claim 2, wherein with respect to a length direction of the opening in which the first end of the first light guide plate is inserted, a space is present between the first light guide plate and the joint member, and with respect to a length direction of the opening in which the first end of the second light guide plate is inserted, a space is present between the second light guide plate and the joint member.

4. The display device according to claim 1, wherein the joint member is made of a flexible material.

5. The display device according to claim 1, further comprising a frame holding the light source and the light guide component therein, wherein a second end of the first light guide plate on an opposite side from the first end of the first light guide plate and a second end of the second light guide plate on an opposite side from the first end of the second light guide plate are fixed to the frame.

6. The display device according to claim 1, wherein the first light guide plate has a thickness smaller than a thickness of the second light guide plate.

7. The display device according to claim 1, wherein the second light guide plate includes a second light guide plate-side light exiting surface opposed to the space and through which light entering through the light entering surface exits toward the first light guide plate, and the second light guide plate includes a surface other than the light entering surface and the second light guide plate-side light exiting surface is covered with the joint member.

8. The display device according to claim 1, wherein the first light guide plate includes a back surface that is a plate surface on an opposite side from the light exiting surface, and the back surface is covered with the joint member.

* * * * *